United States Patent
Tacca et al.

(10) Patent No.: US 10,804,558 B2
(45) Date of Patent: Oct. 13, 2020

(54) NON-AQUEOUS REDOX FLOW BATTERIES

(71) Applicant: ENI S.P.A., Rome (IT)

(72) Inventors: Alessandra Tacca, Gallarate (IT); Andrea Pellegrino, Trecate (IT)

(73) Assignee: Eni S.P.A., Rome (IT)

( * ) Notice: Subject to any disclaimer, the term of this patent is extended or adjusted under 35 U.S.C. 154(b) by 26 days.

(21) Appl. No.: 16/315,289

(22) PCT Filed: Jul. 7, 2017

(86) PCT No.: PCT/IB2017/054106
§ 371 (c)(1),
(2) Date: Jan. 4, 2019

(87) PCT Pub. No.: WO2018/007991
PCT Pub. Date: Jan. 11, 2018

(65) Prior Publication Data
US 2019/0319290 A1    Oct. 17, 2019

(30) Foreign Application Priority Data
Jul. 8, 2016    (IT) .................... 102016000071670

(51) Int. Cl.
*H01M 8/18*        (2006.01)
*H01M 8/20*        (2006.01)
(Continued)

(52) U.S. Cl.
CPC ............ *H01M 8/188* (2013.01); *H01M 8/184* (2013.01); *H01M 8/20* (2013.01); *H01M 10/056* (2013.01);
(Continued)

(58) Field of Classification Search
CPC ........ H01M 8/184; H01M 8/188; H01M 8/20; H01M 2300/0028; H01M 2300/0025;
(Continued)

(56) References Cited

U.S. PATENT DOCUMENTS

2013/0224538 A1*    8/2013    Jansen .................... H01M 8/20
429/72

OTHER PUBLICATIONS

International Search Report & Written Opinion for PCT/IB2017/054106 dated Sep. 20, 2017, 9 pages.
(Continued)

*Primary Examiner* — Ula C Ruddock
*Assistant Examiner* — Matthew W Van Oudenaren
(74) *Attorney, Agent, or Firm* — Praedcere Law

(57) ABSTRACT

Non-aqueous redox flow battery (RFB) comprising: a positive compartment in which a positive electrode is positioned and in which a positive non-aqueous liquid electrolyte is caused to flow; a negative compartment in which a negative electrode is positioned and in which a negative non-aqueous liquid electrolyte is caused to flow; an ion-exchange membrane positioned between the positive compartment and the negative compartment in which: said positive non-aqueous liquid electrolyte comprises a solution of copper triflate or tetrafluoroborate complexes [Cu(I) or Cu(II)] in at least one organic solvent; said negative non-aqueous liquid electrolyte comprises a solution of at least one benzothiadiazole or a derivative thereof in at least one organic solvent.

7 Claims, 8 Drawing Sheets

(51) Int. Cl.
*H01M 10/627* (2014.01)
*H01M 10/056* (2010.01)
*H01M 10/36* (2010.01)

(52) U.S. Cl.
CPC .......... *H01M 10/36* (2013.01); *H01M 10/627* (2015.04); *H01M 2220/10* (2013.01); *H01M 2300/0028* (2013.01)

(58) Field of Classification Search
CPC .. H01M 10/056; H01M 10/36; H01M 10/627; H01M 2220/10
See application file for complete search history.

(56) References Cited

OTHER PUBLICATIONS

Ke Gong et al: "Nonaqueous redox-flow 1-7 batteries:organic solvents, supporting electrolytes, and redox pairs", Energy & Environmental Science, vol. 8, No. 12, Jan. 1, 2015 (Jan. 1, 2015), pp. 3515-3530.
Sum et al., "Journal of Power Sources" (1985), vol. 15, issues 2-3, pp. 179-190.
Sum et al., "Journal of Power Sources" (1985), vol. 16, issue 2, pp. 85-95.
Aaron et al., "Journal of Power Sources" (2012), vol. 206, pp. 450-453.
Huskinson et al., in "Nature" (2014), vol. 505, pp. 195-198.
Lin et al., in "Science" (2015), vol. 349, issue 6255, pp. 1529-1532.
Chakrabarti et al., in "Electrochimica Acta" (2007), vol. 52, pp. 2189-2195.
Kaur et al., in "Energy Technology" (2015), vol. 3, pp. 476-480.
Li et al., in "Electrochemical and Solid-State Letters" (2011), vol. 14, issue 12, A171-A173.
Gong et al., in "Energy & Environmental Science" (2015), vol. 8, pp. 3515-3530.

\* cited by examiner

NON-AQUEOUS REDOX FLOW BATTERIES

The present invention relates to non-aqueous redox flow batteries (RFB).

More particularly, the present invention relates to a non-aqueous redox flow battery (RFB) comprising: a positive compartment in which a positive electrode is positioned and in which a positive non-aqueous liquid electrolyte is caused to flow; a negative compartment in which a negative electrode is positioned and in which a negative non-aqueous liquid electrolyte is caused to flow; an ion-exchange membrane positioned between the positive compartment and the negative compartment in which: said positive non-aqueous liquid electrolyte comprises a solution of copper triflate or tetrafluoroborate complexes [Cu(I) or Cu(II)] in at least one organic solvent; said negative non-aqueous liquid electrolyte comprises a solution of at least one benzothiadiazole or a derivative thereof in at least one organic solvent.

Said non-aqueous redox flow battery (RFB) may advantageously be used in devices which require a moderate to large power output (e.g., about 100 kW-100 MW) for a number of hours (i.e. >1 hour) such as, for example, devices for storing energy derived from industrial plants or from alternative energy sources (such as, solar or wind energy) for subsequent use (for example, for domestic use) or for sale.

Redox flow batteries (RFB) are becoming an ever more promising technology in the context of energy storage, thanks to their low environmental impact and safety of operation.

Redox flow batteries (RFB) are a type of rechargeable battery in which electrolytes containing solutions of one or more electroactive species are caused to flow through an electrochemical cell which converts the chemical energy directly into electrical energy.

Said electrochemical cell is normally made up of a negative compartment (or negative half-cell) and a positive compartment (or positive half-cell) which are separated by an ion-exchange membrane. Thanks to said electrolytes being stored in external tanks, the power components (i.e. the output power which depends on the dimensions and design of said electrochemical cell) and the energy components (i.e. the stored energy which depends on the dimensions of said external tanks and on the concentration of the electrolytes contained therein) are decoupled with a net gain in terms of the flexibility in the application thereof.

The characteristic feature of said solutions of one or more electroactive species is the high energy density which depends on various factors such as, for example, the concentration in solution of the electroactive species which react, the number of electrons transferred in the positive or negative compartment (or half-cell) and the reaction potential.

The first generation of aqueous redox flow batteries (RFB) is represented by "all vanadium" redox flow batteries (RFB) (hereafter denoted "VRFB" for simplicity's sake). In "VRFB", the electroactive species are made up of acidic solutions of the four different oxidation states of vanadium: namely, vanadium in oxidation state (II) [V(II)] and vanadium in oxidation state (III) [V(III)] in the negative compartment and vanadium in oxidation state (IV) [V(IV)] and vanadium in oxidation state (V) [V(V)] in the positive compartment. Generally, in said "VRFB", the cell's open-circuit potential difference (or standard potential) (E°) is ranging from about 1.2 V to 1.6 V, the typical concentration of the electroactive species in the electrolyte is 2 M [in a 5 M aqueous solution of sulfuric acid ($H_2SO_4$)], with an energy density ranging from 20 Wh/l to 30 Wh/l. One of the advantages of said "VRFB" is precisely the use of electrolytes composed of a single element in both the compartments, as a result of which contamination through the membrane is reduced to negligible levels. However, the maximum concentration of the various species of vanadium in the electrolyte is limited by the poor solubility and stability thereof, specifically in the case of vanadium in oxidation state (V) [V(V)] which undergoes thermal precipitation above 40° C., and the open-circuit potential difference (E°) is determined by the stability window of water (i.e. on electrolysis of the water).

Further details relating to said "VRFB" may be found, for example, in: Sum E. et al., "*Journal of Power Sources*" (1985), vol. 15, issues 2-3, pp. 179-190; Sum E. et al., "*Journal of Power Sources*" (1985), vol. 16, issue 2, pp. 85-95; Aaron D. S. et al., "*Journal of Power Sources*" (2012), vol. 206, pp. 450-453.

Over the years, other types of aqueous redox flow batteries (RFB) have been investigated.

For example, Huskinson B. et al., in "*Nature*" (2014), vol. 505, pp. 195-198, describe an aqueous flow battery containing no metal which has low-cost carbon electrodes and uses the quinone/hydroquinone redox couple in the negative compartment and the $Br_2/Br^-$ redox couple in the positive compartment. Using organic molecules instead of metals is said to be a new and promising way of achieving low-cost electrical energy storage.

In a later study, Lin K. et al., in "*Science*" (2015), vol. 349, issue 6255, pp. 1529-1532, the $Br_2/Br^-$ redox couple is replaced by the ferrocyanate/ferricyanate redox couple in the positive compartment. The resultant aqueous flow batteries have the advantage of comprising compounds which are non-toxic, non-flammable and safe to use both for the operators and for the environment.

Since, as was stated above, in aqueous redox flow batteries (RFB) the open-circuit potential difference (E°) is determined by the stability window of water (i.e. on electrolysis of the water), further studies have been carried out in relation to the use of electrolytes comprising organometallic electroactive species which are soluble in organic solvents. For example, Chakrabarti M. H. et al., in "*Electrochimica Acta*" (2007), vol. 52, pp. 2189-2195, describe electrolytes comprising organometallic species in acetonitrile: in particular, an electrolyte comprising the redox couple ruthenium acetylacetonate [Ru(acac)$_2$], which shows a high elevated stability and solubility in acetonitrile, is described in both the positive compartment and the negative compartment. The non-aqueous redox flow batteries (RFB) obtained are said to have high efficiency.

Kaur A. P. et al., in "*Energy Technology*" (2015), vol. 3, pp. 476-480, describe a non-aqueous redox flow battery (RFB) in which the electrolyte in the positive compartment (catholyte) comprises a phenothiazine derivative, in particular 3,7-bis(trifluoromethyl)-N-ethylphenoxythiazine (BCF3EPT) and the electrolyte in the negative compartment (anolyte) comprises 2,3,6-trimethylquinoxaline. The phenothiazine derivatives have high stability and solubility in solvents based on carbonates (for example, propylene carbonate): however, Kaur A. P. et al., consider that further studies will be necessary for the purpose of improving the performance of the non-aqueous redox flow batteries (RFB) containing them.

Li Z. et al., in "*Electrochemical and Solid-State Letters*" (2011), vol. 14, issue 12, A171-A173, describe non-aqueous redox flow batteries (RFB) which use 2,2,6,6-tetramethyl-1-piperinyloxy/NaClO$_4$/acetonitrile as electrolyte in the positive compartment (catholyte) and N-methylphthalimide/

NaClO$_4$/acetonitrile as electrolyte in the negative compartment (anolyte). When subjected to charge-discharge tests, the above-stated non-aqueous redox flow batteries (RFB) are said to have stable charge-discharge curves and high coulombic efficiency (90%) for the first 20 cycles.

Gong K. et al., in "*Energy & Environmental Science*" (2015), vol. 8, pp. 3515-3530, describe various types of non-aqueous redox flow batteries (RFB): in particular the use of different organic solvents, different supporting electrolytes and different redox couples. Among other things, they describe a non-aqueous redox flow battery (RFB) with an ultra-high voltage [i.e. having an ultra-high open-circuit potential difference (E°)], i.e. 4.5 V, when an electrolyte comprising biphenyl and a 1 M solution of lithium hexafluorophosphate (LiPF$_6$) in dimethylformamide (DMF) is used in the negative compartment and an electrolyte comprising octafluoronaphthalene and a 1 M solution of lithium hexafluorophosphate (LiPF$_6$) in propylene carbonate (PC) is used in the positive compartment.

American patent application US 2013/0224538 describes a non-aqueous redox flow battery (RFB) comprising: a negative electrode immersed in a negative non-aqueous liquid electrolyte, a positive electrode immersed in a positive non-aqueous liquid electrolyte, and a cation-permeable separator (e.g., a porous membrane, a film, a sheet or a panel) placed between the negative electrolyte and the positive electrolyte. During charge-discharge, the electrolytes circulate within their respective electrodes. Each of the electrolytes comprises an electrolyte salt (e.g., a salt of sodium or lithium), a redox reagent containing no transition metals, and optionally an electrochemically stable organic solvent. Each redox reagent is selected from an organic compound comprising an unsaturated conjugate moiety, a boron compound, and combinations thereof. The organic redox reagent present in the positive electrolyte is selected in such a way as to have a redox potential greater than that of the redox reagent present in the negative electrolyte. The above-stated non-aqueous redox flow battery (RFB) is said to be more efficient than known redox flow batteries (RFB).

Since, as stated above, redox flow batteries (RFB) are becoming an ever more promising technology in the context of energy storage, thanks to their low environmental impact and safety of operation, there is still great interest in investigating new, in particular non-aqueous, redox flow batteries (RFB).

Therefore, the Applicant has faced the problem of identifying a non-aqueous redox flow battery (RFB) which is capable of providing good performance, i.e. which has a high open-circuit potential difference (E°) and a high energy density ($\rho_e$).

The Applicant has now found that using a non-aqueous liquid electrolyte comprising a solution of copper triflate or tetrafluoroborate complexes [Cu(I) or Cu(II)] in at least one organic solvent in the positive compartment and a non-aqueous liquid electrolyte comprising a solution of at least one benzothiadiazole or a derivative thereof in at least one organic solvent in the negative compartment, makes it possible to obtain a non-aqueous redox flow battery (RFB) capable of providing good performance, i.e. a high open-circuit potential difference (E°) and a high energy density ($\rho_e$). Furthermore, both the copper triflate or tetrafluoroborate complexes [Cu(I) or Cu(II)] and the benzothiadiazole or a derivative thereof exhibit good stability during the charge-discharge cycles of said non-aqueous redox flow battery (RFB) and high solubility in the organic solvent used. Furthermore, both the copper triflate or tetrafluoroborate complexes [Cu(I) or Cu(II)] and the benzothiadiazole or a derivative thereof are non-toxic compounds and hence non-harmful both from an environmental standpoint and with regard to the health of the operators. Finally, both the copper triflate or tetrafluoroborate complexes [Cu(I) or Cu(II)] and the benzothiadiazole or a derivative thereof are readily commercially available and hence advantageous from an economic standpoint.

The present invention accordingly provides a non-aqueous redox flow battery (RFB) comprising:
  a positive compartment in which a positive electrode is positioned and in which a positive non-aqueous liquid electrolyte is caused to flow;
  a negative compartment in which a negative electrode is positioned and in which a negative non-aqueous liquid electrolyte is caused to flow;
  an ion-exchange membrane positioned between the positive compartment and the negative compartment
in which:
  said positive non-aqueous liquid electrolyte comprises a solution of copper triflate or tetrafluoroborate complexes [Cu(I) or Cu(II)] in at least one organic solvent;
  said negative non-aqueous liquid electrolyte comprises a solution of at least one benzothiadiazole or a derivative thereof in at least one organic solvent.

For the purpose of the present description and of the following claims, unless stated otherwise, definitions of numerical ranges always include the extremes.

For the purpose of the present description and of the following claims, the term "comprising" also encompasses the terms "which essentially consists of" or "which consists of".

According to a preferred embodiment of the present invention, said copper triflate or tetrafluoroborate complexes [Cu(I) or Cu(II)] may be selected, for example, from: tetrakisacetonitrile copper(I) triflate [Cu(NCCH$_3$)$_4$.CF$_3$SO$_3$], copper(II) trifluoromethanesulfonate [Cu(CF$_3$SO$_3$)$_2$], tetrakisacetonitrile copper(I) tetrafluoroborate [Cu(NCCH$_3$)$_4$.BF$_4$], or mixtures thereof.

According to a preferred embodiment of the present invention, said benzothiadiazole or a derivative thereof may be selected, for example, from benzothiadiazoles having general formula (I):

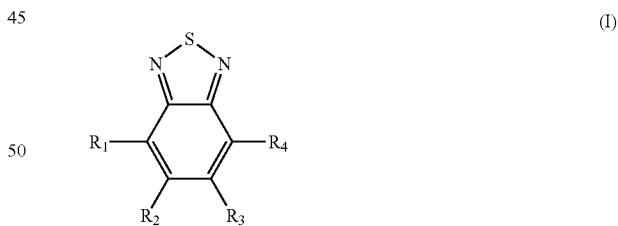

in which R$_1$, R$_2$, R$_3$ and R$_4$, mutually identical or different, represent a hydrogen atom, or a halogen atom such as, for example, chlorine, fluorine, bromine, iodine, preferably fluorine; or represent one of the following groups: —CN, —NO$_2$, —COOH, —SO$_3$H, —SH; or are selected from: linear or branched, saturated or unsaturated C$_1$-C$_{10}$, preferably C$_1$-C$_4$, alkyl groups, linear or branched, saturated or unsaturated C$_1$-C$_{10}$, preferably C$_1$-C$_4$, alkoxy groups, carboxylic esters having general formula R'—COO—R" in which R' and R", mutually identical or different, are selected from linear or branched, saturated or unsaturated C$_1$-C$_{10}$, preferably C$_1$-C$_4$, alkyl groups, sulfonic esters having general formula R'—OSO$_2$—R" in which R' and R" have the same meanings described above, thioesters having general formula R'—SO—R" in which R' and R" have the same meanings described above, —(O—CH$_2$—CH$_2$)$_n$—OH groups in which n is an integer ranging from 1 to 4, —(O—CH(CH$_3$)—CH$_2$)$_n$—OH groups in which n is an integer ranging from 1 to 4, optionally substituted aryl groups, optionally substituted heteroaryl groups.

For the purpose of the present description and of the following claims, the term "C$_1$-C$_{10}$ alkyl groups" denotes linear or branched, saturated or unsaturated, alkyl groups having from 1 to 10 carbon atoms. Specific examples of C$_1$-C$_{10}$ alkyl groups are: methyl, ethyl, n-propyl, iso-propyl, n-butyl, iso-butyl, t-butyl, n-pentyl, n-hexyl, n-heptyl, n-octyl, n-decyl. For the purpose of the present description and of the following claims, the term "C$_1$-C$_{10}$ alkoxy groups" denotes groups comprising an oxygen atom to which is attached a linear or branched, saturated or unsaturated, C$_1$-C$_{10}$ alkyl group. Specific examples of C$_1$-C$_{10}$ alkoxy groups are: methoxy, ethoxy, n-propoxy, iso-propoxy, n-butoxy, iso-butoxy, t-butoxy, pentoxy, hexyloxy, 2-ethyl-ethoxy, heptyloxy, octyloxy, nonyloxy, decyloxy. For the purpose of the present description and of the following claims, the term "aryl groups" denotes aromatic carbocyclic groups. Said aryl groups may optionally be substituted with one or more mutually identical or different groups selected from: halogen atoms such as, for example, fluorine, chlorine, bromine; hydroxyl groups; C$_1$-C$_{12}$ alkyl groups; C$_1$-C$_{12}$ alkoxy groups; cyano groups; amino groups; nitro groups. Specific examples of aryl groups are: phenyl, methylphenyl, trimethylphenyl, methoxyphenyl, hydroxyphenyl, phenyloxyphenyl, fluorophenyl, chlorophenyl, bromophenyl, nitrophenyl, dimethylaminophenyl, naphthyl, phenylnaphthyl, phenanthrene, anthracene.

For the purpose of the present description and of the following claims, the term "heteroaryl groups" denotes five- or six-membered aromatic heterocyclic groups, including benzo-fused or heterobicyclic groups, containing from 4 to 60 carbon atoms and from 1 to 4 heteroatoms selected from among nitrogen, oxygen, sulfur, silicon, selenium, phosphorus. Said heteroaryl groups may optionally be substituted with one or more mutually identical or different groups selected from: halogen atoms such as, for example, fluorine, chlorine, bromine, preferably fluorine; hydroxyl groups; C$_1$-C$_{12}$ alkyl groups; C$_1$-C$_{12}$ alkoxy groups; C$_1$-C$_{12}$ thioalkoxy groups; C$_3$-C$_{24}$ trialkylsilyl groups; polyethyleneoxy groups; cyano groups; amino groups; C$_1$-C$_{12}$ mono- or di-alkylamino groups; nitro groups. Specific examples of heteroaryl groups are: pyridine, methylpyridine, methoxypyridine, phenylpyridine, fluoropyridine, pyrimidine, pyridazine, pyrazine, triazine, tetrazine, quinoline, quinoxaline, quinazoline, furan, thiophene, hexylthiophene, bromothiophene, dibromothiophene, pyrrole, oxazole, thiazole, isoxazole, isothiazole, oxadiazole, thiadiazole, pyrazole, imidazole, triazole, tetrazole, indole, benzofuran, benzothiophene, benzoxazole, benzothiazole, benzoxadiazole, benzothiadiazole, benzopyrazole, benzimidazole, benzotriazole, triazolopyridine, triazolopyrimidine, coumarin.

According to a preferred embodiment of the present invention, in said general formula (I), R$_1$, R$_2$, R$_3$ and R$_4$, mutually identical, represent a hydrogen atom.

It should be noted that, for the purpose of the present invention, if a solution of copper(II) triflate complexes [Cu(II)] is used as starting material, the solution comprising a benzothiadiazole or a derivative thereof (BTD) must be subjected to electrolysis in order to obtain a benzothiadiazole or a derivative thereof in reduced form (BTD.$^-$), before being supplied to the negative compartment.

The above-stated electrolytes may comprise at least one supporting electrolyte. The supporting electrolyte is capable of maintaining a charge balance between the electrolyte in the negative compartment and the electrolyte in the positive compartment without, however, participating in the reaction. In general, the supporting electrolyte must be chemically inert over the range of potential in question, must have high ionic conductivity to ensure low resistance to the passage of current and must not obstruct electron exchange on the electrode surface.

According to one embodiment of the present invention, the above-stated electrolytes comprise at least one supporting electrolyte selected, for example, from lithium tetrafluoroborate (LiBF$_4$), lithium hexafluorophosphate (LiPF$_6$), lithium perchlorate (LiClO$_4$), lithium methyltrifluoromethanesulfonate CF$_3$SO$_3$), lithium bis(trifluoromethylsulfonyl) imide [Li(CF$_3$SO$_2$)$_2$N], tetraethylammonium tetrafluoroborate (TEABF$_4$), tetrabutylammonium tetrafluoroborate (TBABF$_4$), or mixtures thereof. Lithium tetrafluoroborate (LiBF$_4$), tetrabutylammonium tetrafluoroborate (TBABF$_4$), are preferred.

According to a preferred embodiment of the present invention, said organic solvent may be selected, for example, from acetonitrile, dimethylacetamide, diethyl carbonate, dimethyl carbonate, γ-butyrolactone (GBL), propylene carbonate (PC), ethylene carbonate (EC), N-methyl-2-pyrrolidone (NMP), fluoroethylene carbonate, N,N-dimethylacetamide, or mixtures thereof. Acetonitrile, propylene carbonate (PC), are preferred.

It should be noted that for the purpose of the present invention, it is preferable to use the same solvent both in the positive compartment and in the negative compartment, so as to avoid any problems of diffusion through the ion-exchange membrane with consequent problems of contamination between the two compartments.

It should also be noted that both said copper triflate or tetrafluoroborate complexes [Cu(I) or Cu(II)] and said benzothiadiazole or a derivative thereof, have a goad solubility in the organic solvent used, i.e. a solubility ranging from 0.05 M to 2 M, preferably ranging from 0.08 M to 1.5 M.

According to a preferred embodiment of the present invention, said ion-exchange membrane may be selected from polymeric membranes such as, for example:

anion-exchange membranes such as, for example, membranes based on a styrene-divinylbenzene copolymer or on a chloromethylstyrene-divinylbenzene copolymer containing amino groups, membranes based on poly (ether ether ketones), membranes based on a divinylbenzene-vinylpyridine copolymer containing a quaternary pyridine group; membranes based on an aromatic polysulfonic copolymer containing a chloromethyl group and amino groups, membranes based on polytetrafluoroethylene (PTFE);

cation-exchange membranes such as, for example, membranes based on a fluoropolymer-copolymer based on tetrafluoroethylene sultanate, membranes based on poly(ether ether ketones), membranes based on polysulfones, membranes based on polyethylene, membranes based on polypropylene, membranes based on ethylene-propylene copolymers, membranes based on polyimides, membranes based on polyvinyl fluorides.

Anion-exchange membranes which may advantageously be usable for the purpose of the present invention and which are commercially available are NEOSEPTA® AMX, NEOSEPTA® AHA, NEOSEPTA® ACS from Astom, Ionac MA3475 from Lanxess, Teflon® from DuPont, Fumasept® FAA-3 from Fumatech.

Cation-exchange membranes which may advantageously be usable for the purpose of the present invention and are commercially available are NEOSEPTA® CMX, NEOSEPTA® CIMS from Astom, Nafion® from DuPont.

The negative electrode may preferably comprise at least one metal such as, for example; platinum, copper, aluminium, nickel, stainless steel; or at least one material containing carbon such as, for example, carbon black, activated carbon, amorphous carbon, graphite, graphene, a nanostructured carbon material; or mixtures thereof. Said negative electrode may be porous, grooved or smooth.

The positive electrode may preferably comprise at least one metal such as, for example, platinum, copper, aluminium, nickel, stainless steel; or at least one material containing carbon such as, for example, carbon black, activated carbon, amorphous carbon, graphite, graphene, a nanostructured carbon material; or mixtures thereof. Said positive electrode may be porous, grooved or smooth.

Figure 1:
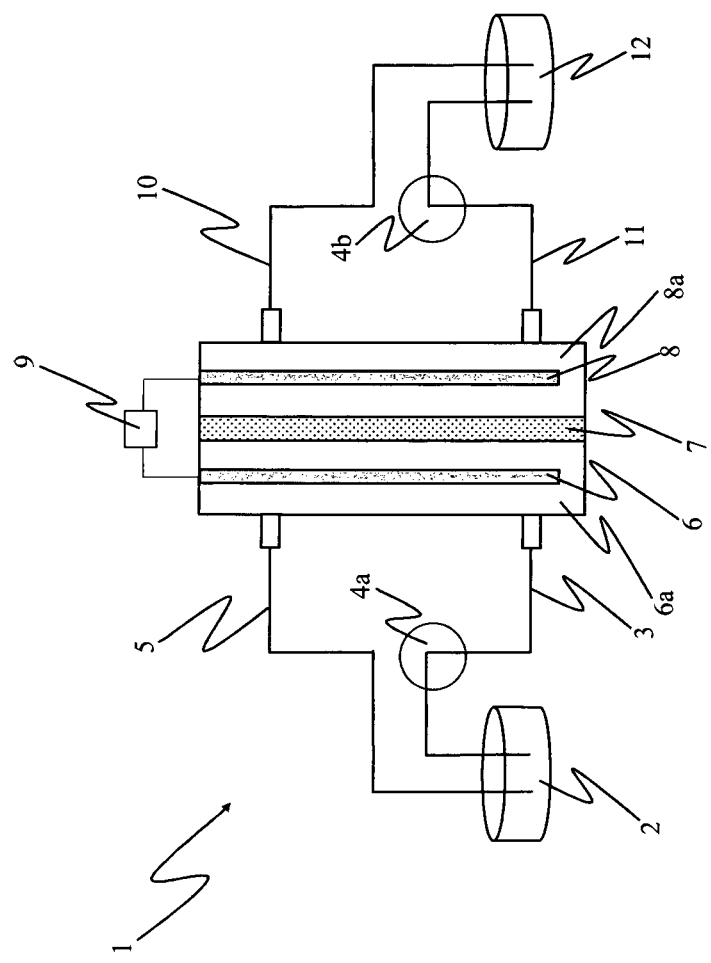
FIG. 1 is a schematice representation of an embodiments of a non-aqueous redox flow battery (RFB) according to the present disclosure.

The present invention will now be illustrated in more detail by an embodiment with reference to FIG. 1 shown below.

In particular, FIG. 1 is a schematic representation of an embodiment of a non-aqueous redox flow battery (RFB) according to the present invention. In this connection, the non-aqueous redox flow battery (RFB) (1) comprises a positive compartment (6a) in which a positive electrode (6) is positioned and in which a positive non-aqueous liquid electrolyte (not shown in FIG. 1) is caused to flow, a negative compartment (8a) in which a negative electrode (8) is positioned and in which a negative non-aqueous liquid electrolyte (not shown in FIG. 1) is caused to flow and an ion-exchange membrane (7) positioned between the positive compartment (6a) and the negative compartment (8a).

The positive compartment (6a) is connected to a tank (2) containing the positive non-aqueous liquid electrolyte comprising a solution of copper triflate or tetrafluoroborate complexes [Cu(I) or Cu(II)] in at least one organic solvent, by an inlet tube (3) and a pump (4a) (for example, a peristaltic pump) and an outlet tube (5) so as to allow the feeding and discharge of said positive non-aqueous liquid electrolyte during the operating cycle (i.e. during the charge-discharge phase).

The negative compartment (8a) is connected to a tank (12) containing the negative non-aqueous liquid electrolyte comprising a solution of at least one benzothiadiazole or a derivative thereof in at least one organic solvent, by an inlet tube (11) and a pump (4b) (for example, a peristaltic pump) and an outlet tube (10) so as to allow the feeding and discharge of said negative non-aqueous liquid electrolyte during the operating cycle (i.e. during the charge-discharge phase).

A voltmeter (9) is connected to the positive electrode (6) and to the negative electrode (8). During the charge phase of the non-aqueous redox flow battery (RFB) (1), a potential difference is applied between the positive electrode and the negative electrode by the voltmeter (9) while, simultaneously, the positive non-aqueous liquid electrolyte is fed by the pump (4a) from the positive electrolyte tank (2) to the positive compartment (6a) and the negative non-aqueous liquid electrolyte is fed by the pump (4b) from the negative electrolyte tank (12) to the negative compartment (8a). Said positive non-aqueous liquid electrolyte present in the positive compartment (6a) undergoes an oxidation reaction on the positive electrode (6) and said negative non-aqueous liquid electrolyte present in the negative compartment (8a) undergoes a reduction reaction on the negative electrode (8): the ions involved in the above-stated oxidation and reduction reactions flow through the ion-exchange membrane (7) in the opposite direction to balance the charges. The reverse reactions occur during the discharge phase of the non-aqueous redox flow battery (RFB) (1). The above-stated charge phase and discharge phase may be schematically represented as follows:

negative electrode:

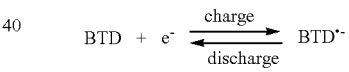

positive electrode:

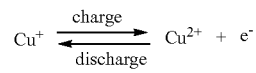

cell:

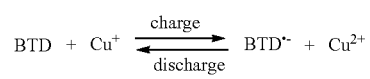

in which:
BTD=benzothiadiazole;
Cu=copper;
e⁻=electrons.

During the operating cycle (i.e. during the charge-discharge phase) both the positive non-aqueous liquid electrolyte and the negative non-aqueous liquid electrolyte, are continuously pumped within the positive and negative compartments, respectively, in order to feed said positive and negative compartments continuously.

The energy stored in the non-aqueous redox flow battery (RFB) (1), may be directly used for operating the apparatus in which it is installed, or may be transferred into an electrical network during peak consumption periods to integrate the power supply. An alternating current/direct current (AC/DC) converter (not shown in FIG. 1) may optionally be used to facilitate transfer of energy to and from an alternating current (AC) power supply network. The present invention will be further illustrated below by means of the following examples which are stated for purely indicative purposes and without limiting the present invention in any way.

EXAMPLE 1

Cyclic Voltammetry Measurements

The cyclic voltammetry measurements were carried out in a half-cell with a three electrode configuration, a glassy carbon working electrode, a platinum counter-electrode and a silver/silver chloride (Ag/AgCl) reference electrode. The redox potentials $E°'_{Ox/Red}$ were obtained from the position of the forward peak ($E_{pf}$) and the return peak ($E_{pr}$):

$$E°'_{Ox/Red} = (E_{pf} + E_{pr})$$

and the values were normalized with reference to the intersolvent ferrocene/ferrocenium (Fc/Fc$^+$) couple.

The evaluations were carried out on an Autolab PGSTAT 128N analytical instrument at a scanning speed of 10, 20, 50, 70, 100, and 200 mV/s. All the evaluations were carried out in triplicate at room temperature (25° C.). The solutions used for this purpose contained:

- benzothiadiazole (Aldrich) (5×10$^{-4}$M) and tetrabutylammonium tetrafluoroborate (TBABF$_4$) (Aldrich) (0.1 M) in acetonitrile (Aldrich) (negative non-aqueous liquid electrolyte of the negative compartment) (BTD);
- benzothiadiazole (Aldrich) (5×10$^{-4}$M) and tetrabutylammonium tetrafluoroborate (TBABF$_4$) (Aldrich) (0.1 M) in propylene carbonate (Aldrich) (negative non-aqueous liquid electrolyte of the negative compartment) (BTD);
- copper(II) trifluoromethanesulfonate [Cu(CF$_3$SO$_3$)$_2$] (Aldrich) (5×10$^{-4}$M) and tetrabutylammonium tetrafluoroborate (TBABF$_4$) (Aldrich) (0.1 M) in acetonitrile (Aldrich) (positive non-aqueous liquid electrolyte of the positive compartment) (Cu triflate);
- tetrakisacetonitrile copper(I) tetrafluoroborate [Cu(NCCH$_3$)$_4$.BF$_4$] (Aldrich) (5×10$^{-4}$M) and tetrabutylammonium tetrafluoroborate (TBABF$_4$) (Aldrich) (0.1 M) in acetonitrile (Aldrich) (positive non-aqueous liquid electrolyte of the positive compartment) [Cu(I) tetrafluoroborate];
- tetrakisacetonitrile copper(I) triflate [Cu(NCCH$_3$)$_4$.CF$_3$SO$_3$] (Aldrich) (5×10$^{-4}$M) and tetrabutylammonium tetrafluoroborate (TBABF$_4$) (Aldrich) (0.1 M) in propylene carbonate (Aldrich) (positive non-aqueous liquid electrolyte of the positive compartment) [Cu(I)].

Figure 2:
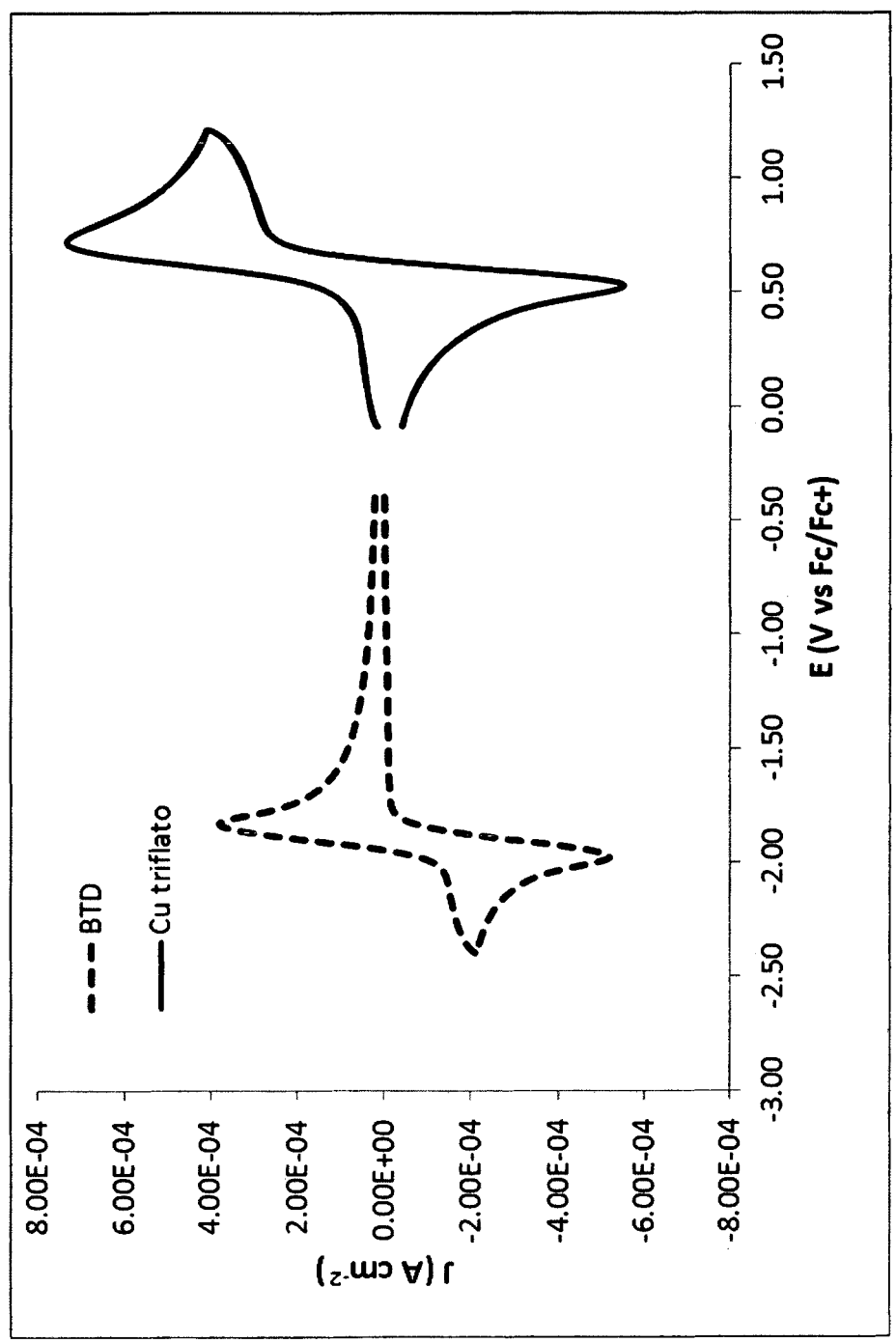
FIG. 2 shows a cyclic voltammogram obtained from solutions referred to in Example I below, BTD and Cu triflate in acetonitrileI at a scanning speed of 200 mV/s.

FIG. 2 [potential (E) measured in volts (V) is reported on the x axis and current density (J) measured in amperes/cm$^2$ (A cm$^{-2}$) is reported on the y axis] shows the cyclic voltammogram obtained from the above-stated solutions (BTD) and (Cu triflate) in acetonitrile, at a scanning speed of 200 mV/s. A high open-circuit potential difference (E°) of 2.52 V calculated according to the following formula may be observed to be obtained:

$$E° = (E°_1) - (E°_2)$$

in which:

- (E°$_1$) is the redox potential for (Cu triflate) calculated as described above and is 0.62 V against (Fc/Fc$^+$);
- (E°$_2$) is the redox potential for (BTD) calculated as described above and is −1.90 V against (Fc/Fc$^+$).

Figure 3:
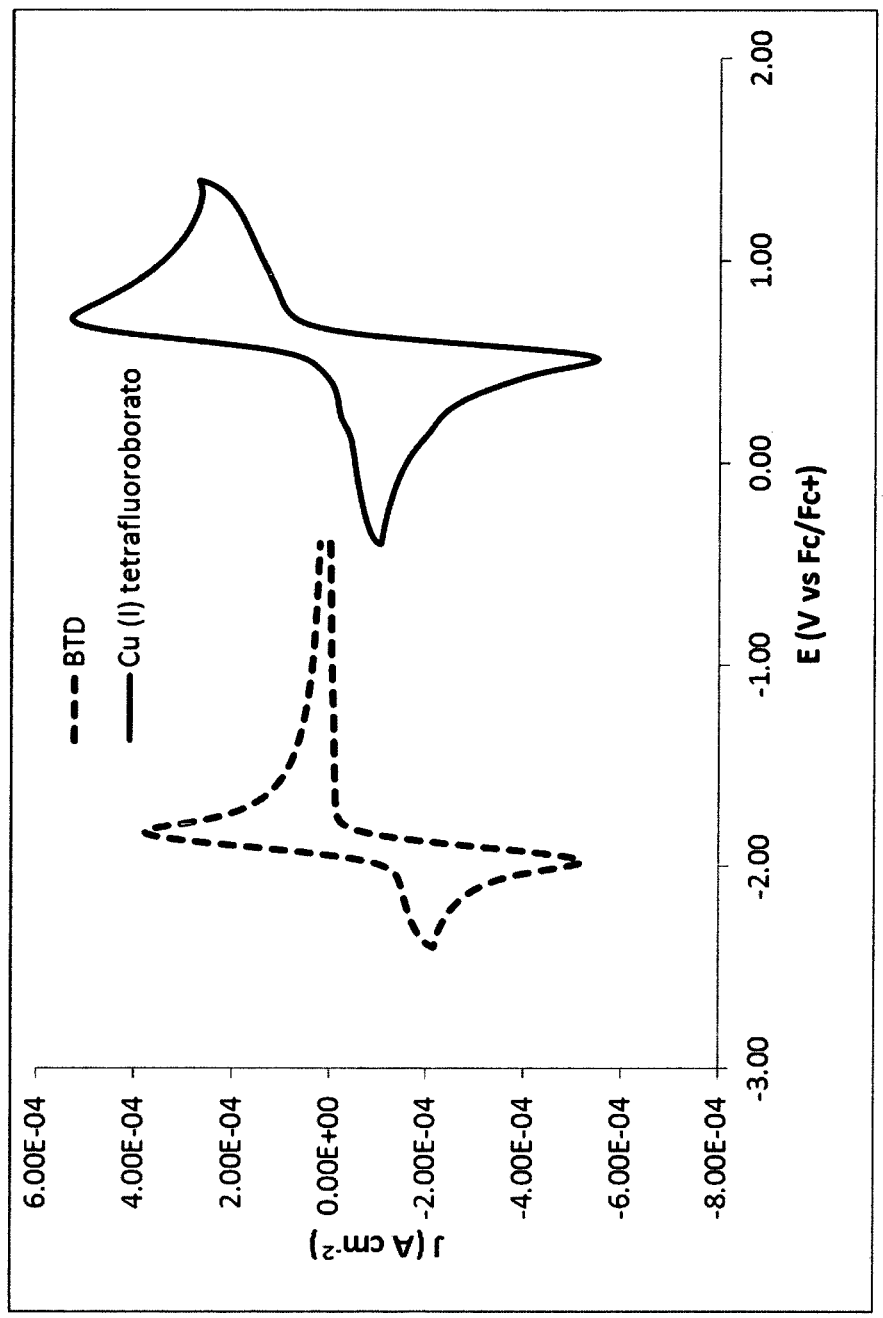
FIG. 3 shows a cyclic voltammogram obtained from solutions referred to in Example I below, BTD and Cu(I) tetrafluoroborate in acetonitrile, at a scanning speed of 200 mV/s.

FIG. 3 [potential (E) measured in volts (V) is reported on the x axis and current density (J) measured in amperes/cm$^2$ (A cm$^{-2}$) is reported on the y axis] shows the cyclic voltammogram obtained from the above-stated solutions (BTD) and [Cu(I) tetrafluoroborate] in acetonitrile at a scanning speed of 200 mV/s.

A high open-circuit potential difference (E°) of 2.52 V calculated according to the following formula may be observed to be obtained:

$$E° = (E°_1) - (E°_2)$$

in which:

- (E°$_1$) is the redox potential for [Cu(I) tetrafluoroborate] calculated as described above and is 0.62 V against (Fc/Fc$^+$);
- (E°$_2$) is the redox potential for BTD calculated as described above and is −1.90 V against (Fc/Fc+).

Figure 4:
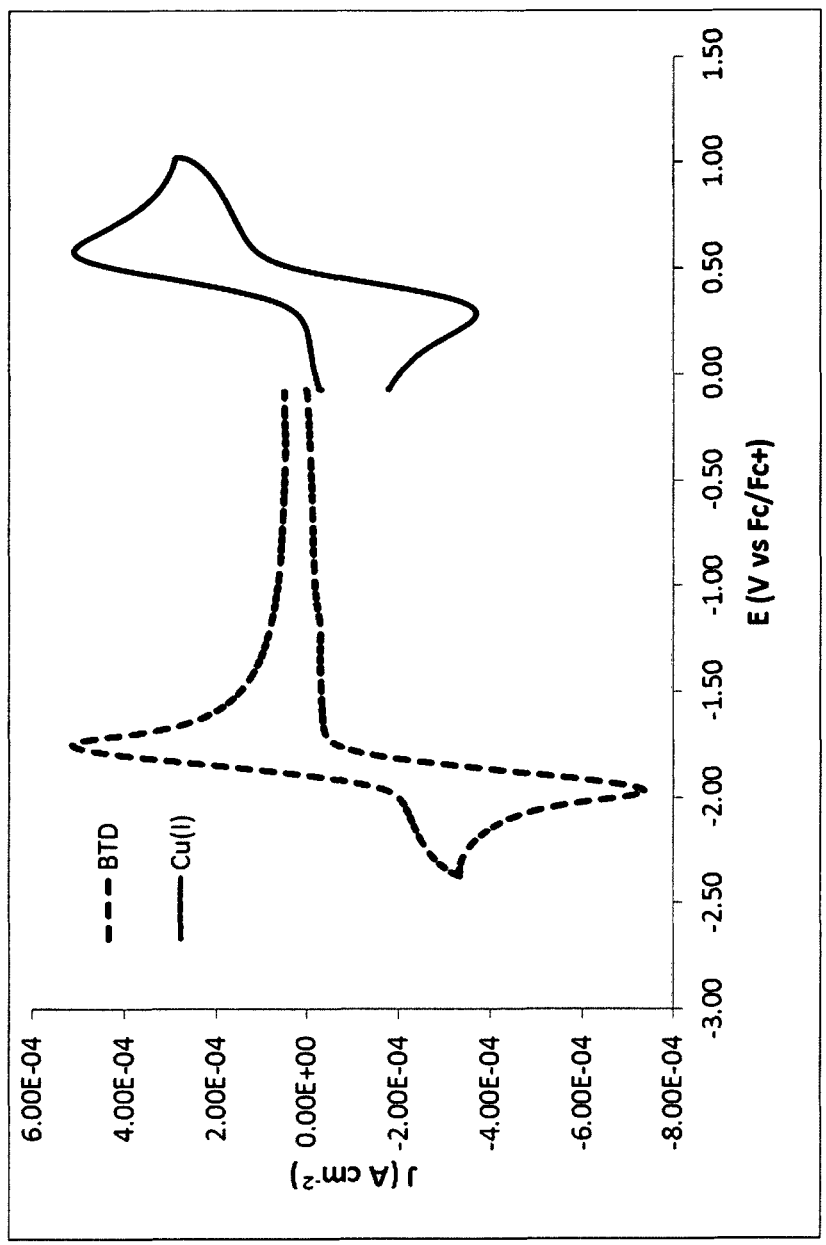
FIG. 4 shows a cyclic voltammogram obtained from solutions referred to in Example I below BTD and CU (I) in ro lene carbonate at a scanning speed of 200 mV/s.

FIG. 4 [potential (E) measured in volts (V) is reported on the x axis and current density (J) measured in amperes/cm$^2$ (A cm$^{-2}$) is reported on the y axis] shows the cyclic voltammogram obtained from the above-stated solutions (BTD) and [Cu(I)] in propylene carbonate at a scanning speed of 200 mV/s.

A high open-circuit potential difference (E°) of 2.29 V calculated according to the following formula may be observed to be obtained:

$$E° = (E°_1) - (E°_2)$$

in which:

- E°$_1$ is the redox potential for [Cu(I)] calculated as described above and is 0.43 V against (Fc/Fc$^+$);
- E°$_2$ is the redox potential for (BTD) calculated as described above and is −1.86 V against (Fc/Fc$^+$).

EXAMPLE 2

Cyclic Voltammetry Stability Test

The stability tests were carried out using the same electrochemical cell as in Example 1. The solutions used for this purpose contained:

- benzothiadiazole (Aldrich) (2×10$^{-3}$ M) and tetrabutylammonium tetrafluoroborate (TBABF$_4$) (Aldrich) 0.1 M in acetonitrile (Aldrich) (negative non-aqueous liquid electrolyte of the negative compartment) (BTD);
- copper(II) trifluoromethanesulfonate [Cu(CF$_3$SO$_3$)$_2$] (Aldrich) (2×10$^{-3}$ M) and tetrabutylammonium tetrafluoroborate (TBABF$_4$) (Aldrich) (0.1 M) in acetonitrile (Aldrich) (non-aqueous liquid electrolyte of the positive compartment) (Cu triflate).

Figure 5:
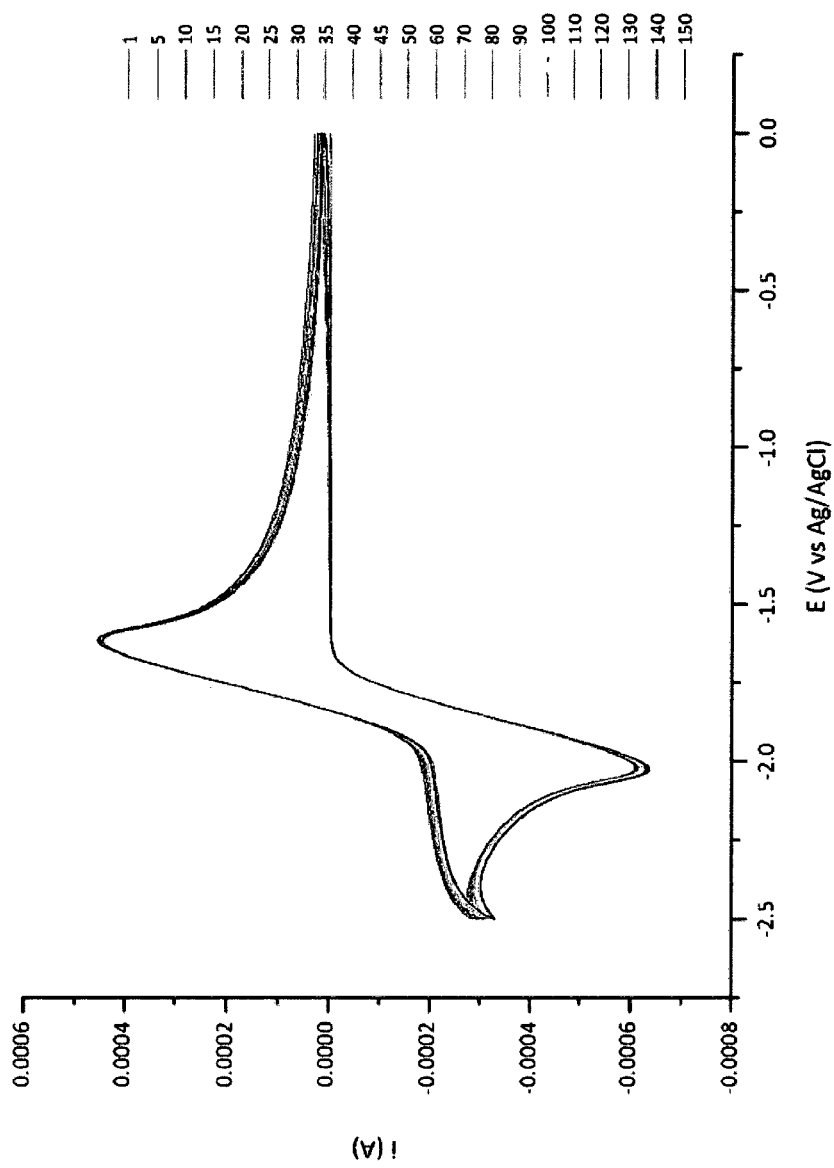
FIG. 5 shows 150 consecutive cycles carried out for the solution referred to in Example 2 below BTD in acetonitrile.

FIG. 5 [potential (E) measured in volts (V) is reported on the x axis and current density (i) measured in amperes (A) is reported on the y axis] shows the 150 consecutive cycles carried out for the above-stated solution of BTD: it may be noted how the cycles can be superimposed, which means that no deposition of material occurs on the electrode due to parasitic reactions or polymerisation reactions and that the radical which is formed is stable.

Figure 6:
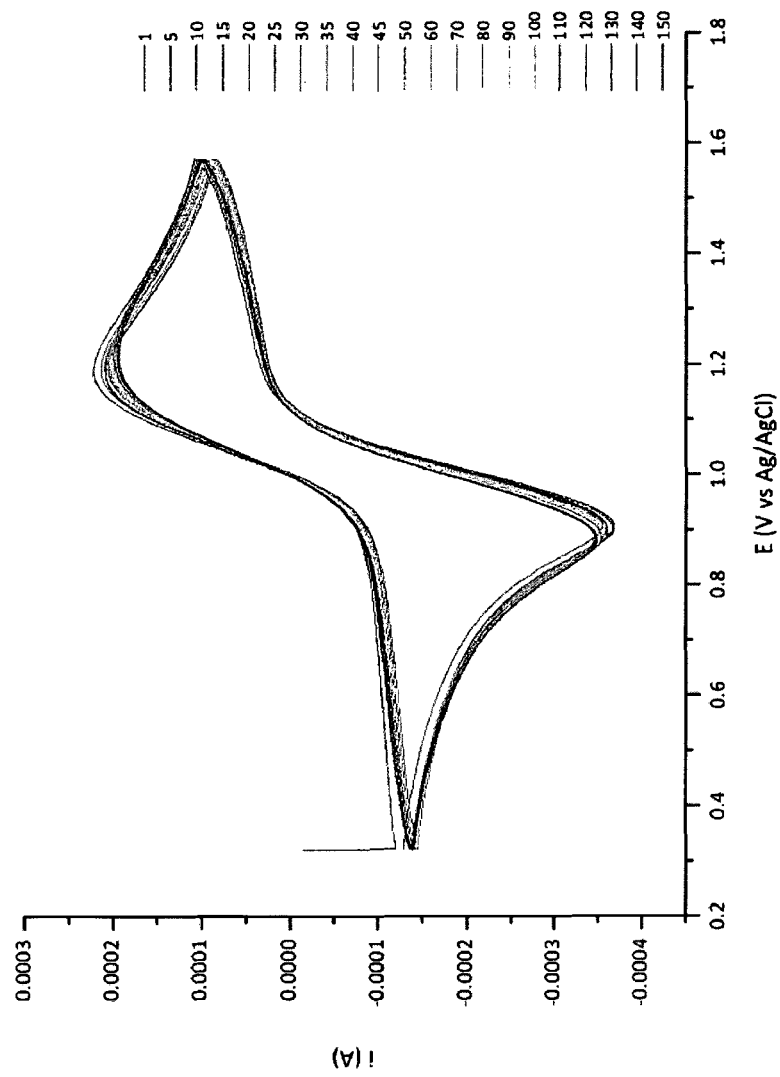
FIG. 6 shows 150 consecutive cycles carried out for the solution referred to in Example 2 below, Cu triflate.

FIG. 6 [potential (E) measured in volts (V) is reported on the x axis and current density (i) measured in amperes (A) is reported on the y axis] shows the 150 consecutive cycles carried out for the above-stated solution of (Cu triflate): it may noted how the cycles can be superimposed, which indicates good stability of the redox couple.

EXAMPLE 3

Charge/Discharge Tests of the Non-Aqueous Redox Flow Battery (RFB) [Electrolytes: Benzothiadiazole (BTD) and Copper(II) Trifluoromethanesulfonate [Cu(CF$_3$SO$_3$)$_2$] in Acetonitrile]

The charge-discharge tests were carried out using an electrochemical cell with Teflon® membrane (DuPont), having a surface area of about 0.8 cm$^2$, placed between two platinum electrodes (Metrohm) having a surface area of about 0.7 cm$^2$. The electrochemical cell was then assembled and sealed in a container containing argon (Ar). The solutions used for this purpose contained:

- benzothiadiazole (Aldrich) (1 M) and tetrabutylammonium tetrafluoroborate (TBABF$_4$) (Aldrich) (0.1 M) in acetonitrile (Aldrich) (negative non-aqueous liquid electrolyte of the negative compartment) (BTD), degassed with argon (Ar) and subjected to electrolysis in order to obtain benzothiadiazole in reduced form (BTD.$^-$);
- copper(II) trifluoromethanesulfonate [Cu(CF$_3$SO$_3$)$_2$] (1 M) and tetrabutylammonium tetrafluoroborate (TBABF$_4$) (Aldrich) (0.1 M) in acetonitrile (Aldrich) (positive non-aqueous liquid electrolyte of the positive compartment) (Cu triflate), degassed with argon (Ar).

6 ml of the above-stated solutions were introduced into the respective compartments. The test was carried out using an Autolab PGSTAT 128N potentiostat/galvanostat (Metrohm) at room temperature (25° C.).

Charge and discharge curves were carried out to evaluate the performance of the electrolytes in the cell. The tests were carried out in potentiostatic mode by applying a charge potential of 1.1 V and a discharge potential of 0.5 V. Each potential was applied for a period of 120 seconds.

Figure 7:
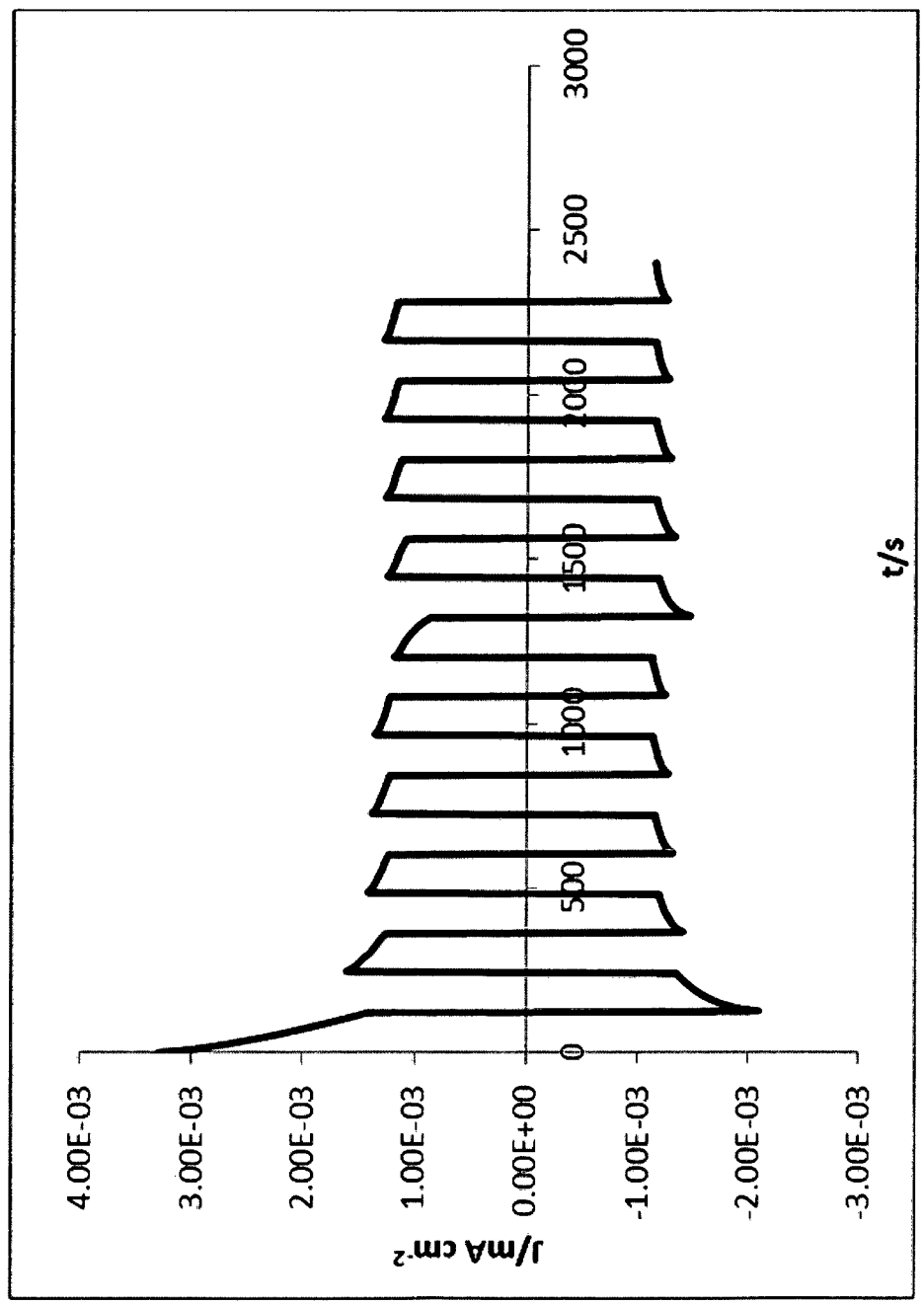
FIG. 7 shows a charge/discharge curve carried out for the solutions referred to in Example 3 below, BTD and copper (ll) trifluoromethanesulfonate Cu(CF$_3$SO$_3$)$_2$] in acetonitrile.

FIG. 7 [time measured in seconds (t/s) is reported on the x axis; current density (J) measured in milliamperes/cm$^2$ (mA cm$^{-2}$) is reported on the y axis] shows the obtained charge/discharge curve. During discharge, the current has a negative sign due to the flow of electrons from the negative pole (BTD) to the positive pole (Cu). Conversely, during charging, the current has a positive sign. The current density values are stable and consequently both species are characterised by good stability during the oxidation-reduction (or redox) cycles.

EXAMPLE 4

Charge/Discharge Tests of the Non-Aqueous Redox Flow Battery (RFB) [Electrolytes: Benzothiadiazole (BTD) and Tetrakisacetonitrile Copper(I) Triflate [Cu(I)] in Propylene Carbonate]

The charge-discharge tests were carried out using the same electrochemical cell as in Example 3.

The solutions used for this purpose contained:
- benzothiadiazole (Aldrich) (1 M) and tetrabutylammonium tetrafluoroborate (TBABF$_4$) (Aldrich) (0.1 M) in propylene carbonate (Aldrich) (negative non-aqueous liquid electrolyte of the negative compartment) (BTD), degassed with argon (Ar);
- tetrakisacetonitrile copper(I) triflate [Cu(NCCH$_3$)$_4$.CF$_3$SO$_3$] (1 M) and tetrabutylammonium tetrafluoroborate (TBABF$_4$) (Aldrich) (0.1 M) in propylene carbonate (positive non-aqueous liquid electrolyte of the positive compartment) [Cu(I)].

6 ml of the above-stated solutions were introduced into the respective compartments. The test was carried out using an Autolab PGSTAT 128N potentiostat/galvanostat (Metrohm) at room temperature (25° C.).

Charge and discharge curves were carried out to evaluate the performance of the electrolytes in the cell. The tests were carried out in potentiostatic mode by applying a charge potential of 1.1 V and a discharge potential of 0.5 V. Each potential was applied for a period of 120 seconds.

Figure 8:
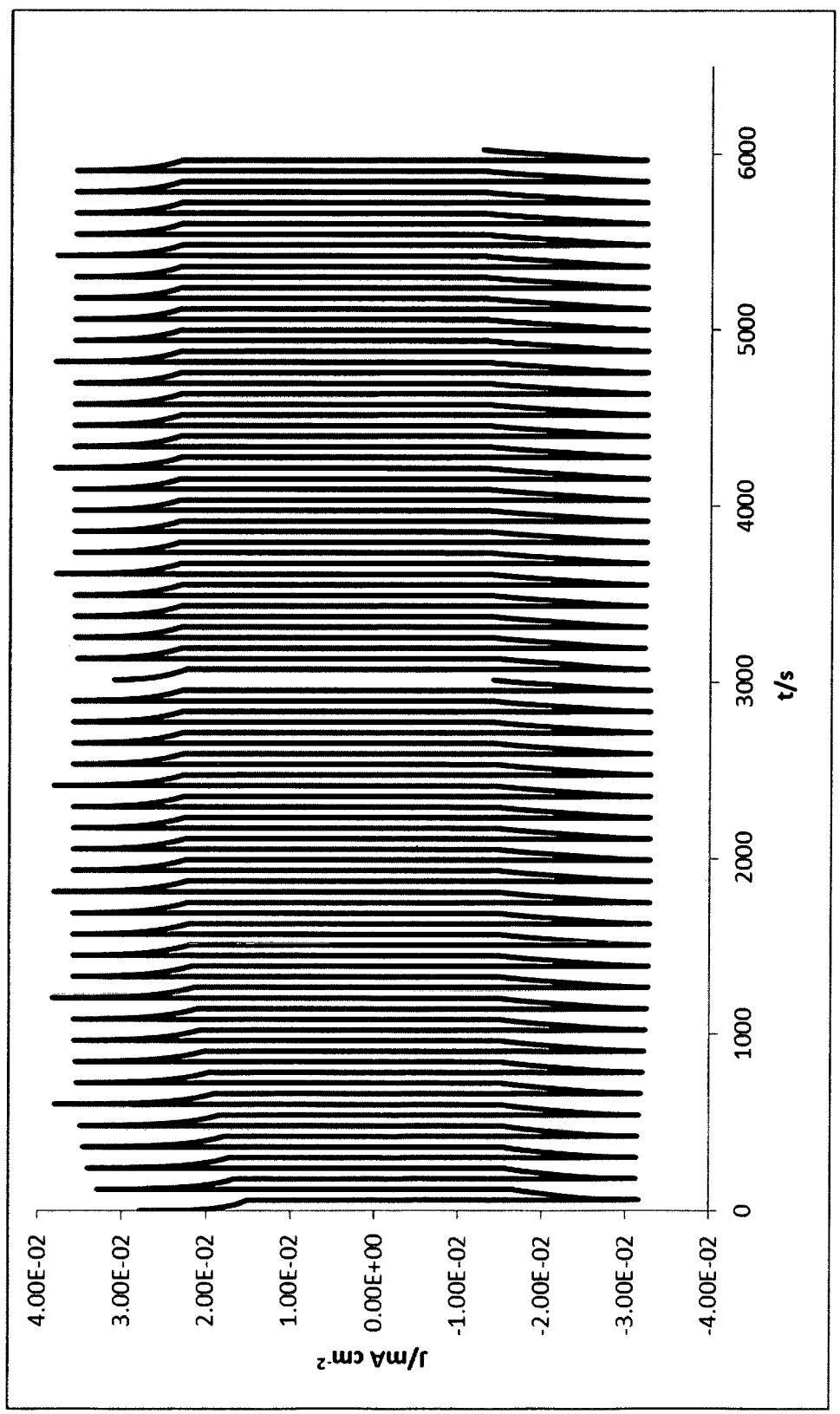
FIG. 8 shows a charge/discharge curve carried out for the solutions referred to in Example 4 below BTD and Cu(I) in propylene carbonate.

FIG. 8 [time measured in seconds (t/s) is reported on the x axis; current density (J) measured in milliamperes/cm$^2$ (mA cm$^{-2}$) is reported on the y axis] shows the resultant charge/discharge curve. During discharge, a negative current is obtained due to the flow of electrons from the negative pole (BTD) to the positive pole (Cu). Conversely, during charging, the current has a positive sign. The current density values are stable and consequently both species are characterised by good stability during the oxidation-reduction (or redox) cycles.

EXAMPLE 5

Calculation of Energy Density

The energy density ($\rho_e$) of a non-aqueous redox flow battery (RFB) is defined as the chemical energy contained in both the compartments (i.e. positive compartment and negative compartment) of the charged battery per unit volume.

For each individual compartment (i.e. positive compartment and negative compartment) of the non-aqueous redox flow battery (RFB) it is possible to define the specific capacity ($\rho_c$) [expressed in amp hours/litre (Ah/l)] of the solution according to the following equation:

$$\rho_c = 26.8 \cdot conc \cdot n$$

in which conc is the concentration of the active species and n is the number of electrons involved in the reaction.

The energy density ($\rho_e$) [expressed in watt hours/litre (Wh/l)] of the non-aqueous redox flow battery (RFB) is defined according to the following equation:

$$\rho_e = \frac{\min(\rho_{c+} \cdot V_+; \rho_{c-} \cdot V_-)}{V_+ + V_-} \cdot E_0$$

in which:
- min is the minimum value between the two products placed in the numerator;
- $\rho c_+$ is the specific capacity measured at the positive pole [expressed in amp hours/litre (Ah/l)];
- $V_+$ is the volume of the positive non-aqueous liquid electrolyte solution [expressed in litres (l)];
- $\rho c_-$ is the specific capacity measured at the negative pole [expressed in amp hours/litre (Ah/l)];
- $V_-$ is the volume of the negative non-aqueous liquid electrolyte solution [expressed in litres (l)];
- $E_0$ is the thermodynamic reaction potential on discharge [expressed in volts (V)].

The following equation must be satisfied in order to have a balanced non-aqueous redox flow battery (RFB) with an equal charge both at the negative pole and at the positive pole:

$$\rho_{c+} \cdot V_+ = \rho_{c-} \cdot V_-$$

in which $\rho c_+$, $V_+$, $\rho c_-$ and $V_-$ have the same meanings described above.

In order to obtain high energy densities, it is thus important to maximise the following parameters:

the concentration in solution of the reacting species;
the number of electrons transferred into the positive compartment and into the negative compartment;
the electrochemical cell potential.

In the case of a non-aqueous redox flow battery (RFB) containing the following solutions:

benzothiadiazole (Aldrich) ($5 \times 10^{-4}$ M) and tetrabutylammonium tetrafluoroborate (TBABF$_4$) (Aldrich) (0.1 M) in acetonitrile (Aldrich) (negative non-aqueous liquid electrolyte of the negative compartment) (BTD), degassed with argon (Ar);

tetrakisacetonitrile copper(I) triflate [Cu(NCCH$_3$)$_4$.CF$_3$SO$_3$] (Aldrich) ($5 \times 10^{-4}$ M) and tetrabutylammonium tetrafluoroborate (TBABF$_4$) (Aldrich) (0.1 M) in acetonitrile (Aldrich) (positive non-aqueous liquid electrolyte of the positive compartment) [Cu(I)];

the theoretical energy density ($\rho_e$) is 51 Wh/l, said theoretical energy density ($\rho_e$) having been calculated assuming:
the process is monoelectronic;
the maximum concentration of the species is 1.5 M;
the open-circuit potential difference value (E°) is 2.52 V.

The invention claimed is:

1. Non-aqueous redox flow battery (RFB) comprising:
a positive compartment in which a positive electrode is positioned and in which a positive non-aqueous liquid electrolyte is caused to flow;
a negative compartment in which a negative electrode is positioned and in which a negative non-aqueous liquid electrolyte is caused to flow;
an ion-exchange membrane positioned between the positive compartment and the negative compartment in which:
said positive non-aqueous liquid electrolyte comprises a solution of copper triflate or tetrafluoroborate complexes [Cu(I) or Cu(II)] in at least one organic solvent;
said negative non-aqueous liquid electrolyte comprises a solution of at least one benzothiadiazole in at least one organic solvent.

2. Non-aqueous redox flow battery (RFB) according to claim 1, in which said copper triflate or tetrafluoroborate complexes [Cu(I) or Cu(II)] are selected from: tetrakisacetonitrile copper(I) triflate [Cu(NCCH$_3$)$_4$.CF$_3$SO$_3$], copper (II) trifluoromethanesulfonate [Cu(CF$_3$SO$_3$)$_2$], tetrakisacetonitrile copper(I) tetrafluoroborate [Cu(NCCH$_3$)$_4$.BF$_4$], or mixtures thereof.

3. Non-aqueous redox flow battery (RFB) according to claim 1, in which said benzothiadiazole is selected from benzothiadiazoles having general formula (I):

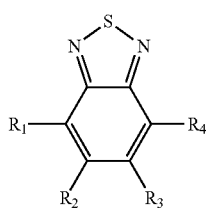

(I)

in which R$_1$, R$_2$, R$_3$ and mutually identical or different, represent a hydrogen atom, or a halogen atom; or represent one of the following groups: —CN, —NO$_2$, —COOH, —SO$_3$H, —SH; or are selected from: linear or branched, saturated or unsaturated C$_1$-C$_{10}$ alkyl groups, linear or branched, saturated or unsaturated C$_1$-C$_{10}$ alkoxy groups, carboxylic: esters having general formula R'—COO—R" in which R' and R", mutually identical or different, are selected from linear or branched, saturated or unsaturated C$_1$-C$_{10}$ alkyl groups, sulfonic esters having general formula R'—OSO$_2$—R" in which R' and R" have the same meanings described above, thioesters having general formula R'—SO—R" in which R' and R" have the same meanings described above, —(O—CH$_2$—CH$_2$)$_n$—OH groups in which n is an integer ranging from 1 to 4, —(O—CH(CH$_3$)—CH$_2$)$_n$—OH groups in which n is an integer ranging from 1 to 4, optionally substituted aryl groups, or optionally substituted heteroaryl groups.

4. Non-aqueous redox flow battery (RFB) according to claim 3, in which in said general formula (I), R$_1$, R$_2$, R$_3$ and R$_4$, mutually identical, represent a hydrogen atom.

5. Non-aqueous redox flow battery (RFB) according to claim 1, in which said electrolytes comprise at least one supporting electrolyte selected from lithium tetrafluoroborate (LiBF$_4$), lithium hexafluorophosphate (LiPF$_6$), lithium perchlorate (LiClO$_4$), lithium methyltrifluoromethanesulfonate (LiCF$_3$SO$_3$), lithium bis(trifluoromethylsulfonyl)imide [Li(CF$_3$SO$_2$)$_2$N], tetraethylammonium tetrafluorborate (TBABF$_4$), tetrabutylammonium tetrafluorborate (TBABF$_4$), or mixtures thereof.

6. Non-aqueous redox flow battery (RFB) according to claim 1, in which said organic solvent is selected from acetonitrile, dimethylacetamide, diethyl carbonate, dimethyl carbonate, γ-butyrolactone (GBL), propylene carbonate (PC), ethylene carbonate (EC), N-methyl-2-pyrrolidone (NMP), fluoroethylene carbonate, N,N-dimethylacetamide, or mixtures thereof.

7. Non-aqueous redox flow battery (RFB) according to claim 1, in which said ion-exchange membrane is selected from the following polymeric membranes:
anion-exchange membranes selected from: membranes based on a styrene-divinylbenzene copolymer or on a chloromethylstyrene-divinylbenzene copolymer containing amino groups, membranes based on poly(ether ether ketones), membranes based on a divinylbenzene-vinylpyridine copolymer containing a quaternary pyridine group; membranes based on an aromatic polysulfonic copolymer containing a chloromethyl group and amino groups, or membranes based on polytetrafluoroethylene (PTFE);
cation-exchange membranes selected from: membranes based on a fluoropolymer-copolymer based on tetrafluoroethylene sulfonate, membranes based on poly (ether ether ketones), membranes based on polysulfones, membranes based on polyethylene, membranes based on polypropylene, membranes based on ethylene-propylene copolymers, membranes based on polyimides, or membranes based on polyvinyl fluorides.

* * * * *